United States Patent
Oyaizu et al.

(10) Patent No.: US 8,682,148 B2
(45) Date of Patent: Mar. 25, 2014

(54) DELTA-SIGMA MODULATED VIDEO PLAYBACK APPARATUS, METHOD, AND COMPUTER-READABLE MEDIUM

(75) Inventors: Hideki Oyaizu, Tokyo (JP); Seiji Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1396 days.

(21) Appl. No.: 12/169,103

(22) Filed: Jul. 8, 2008

(65) Prior Publication Data

US 2009/0016698 A1    Jan. 15, 2009

(30) Foreign Application Priority Data

Jul. 9, 2007    (JP) ................ P2007-179185

(51) Int. Cl.
 *H04N 5/93*    (2006.01)
 *H04N 9/804*    (2006.01)
(52) U.S. Cl.
 CPC .................. *H04N 9/8042* (2013.01)
 USPC ......................... 386/357; 386/353
(58) Field of Classification Search
 USPC ................. 386/353, 357
 See application file for complete search history.

(56) References Cited

U.S. PATENT DOCUMENTS

| | | | | |
|---|---|---|---|---|
| 5,646,621 A | * | 7/1997 | Cabler et al. | 341/143 |
| 2006/0193348 A1 | * | 8/2006 | Unno et al. | 370/535 |
| 2007/0120990 A1 | * | 5/2007 | Sato et al. | 348/294 |

FOREIGN PATENT DOCUMENTS

| | | |
|---|---|---|
| JP | 09-219875 | 8/1997 |
| JP | 2004-219647 | 8/2004 |
| WO | WO 2006/025232 A1 | 3/2006 |

* cited by examiner

*Primary Examiner* — Ashok Patel
*Assistant Examiner* — Alexander Lagor
(74) *Attorney, Agent, or Firm* — Finnegan, Henderson, Farabow, Garrett & Dunner, L.L.P.

(57) ABSTRACT

A moving image playback apparatus includes: a data playback section playing back delta-sigma modulated data generated by performing delta-sigma modulation on pixel values of consecutive frames for each pixel; a video-data playback section performing filtering processing on the delta-sigma modulated data played back by the data playback section using a filter for each pixel to play back video data; and a control section controlling the filtering processing.

10 Claims, 4 Drawing Sheets

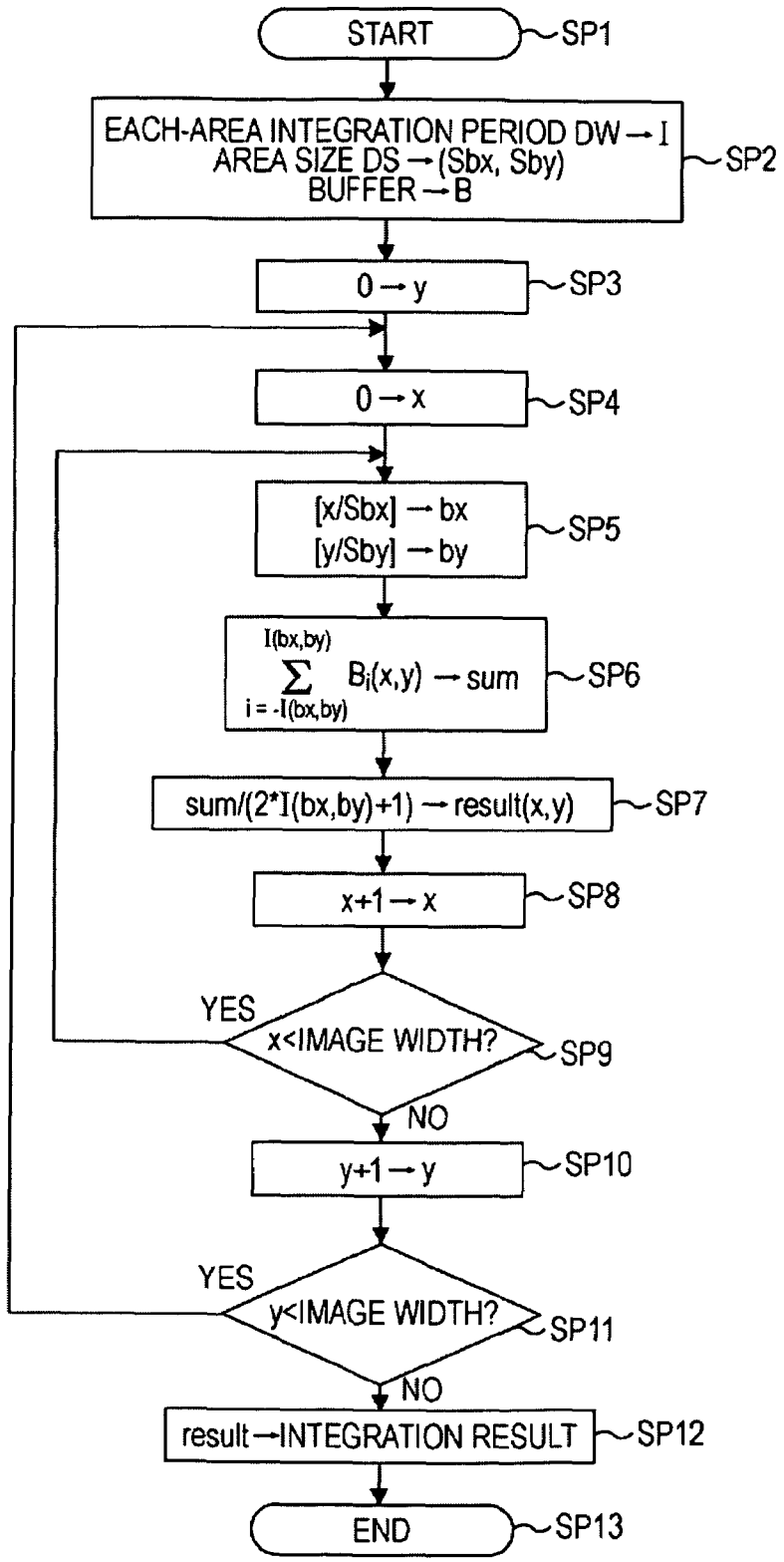

DELTA-SIGMA MODULATED VIDEO PLAYBACK APPARATUS, METHOD, AND COMPUTER-READABLE MEDIUM

CROSS REFERENCES TO RELATED APPLICATIONS

The present invention contains subject matter related to Japanese Patent Application JP 2007-179185 filed in the Japanese Patent Office on Jul. 9, 2007, the entire contents of which are incorporated herein by reference.

BACKGROUND OF THE INVENTION

1. Field of the Invention

The present invention relates to a moving image playback apparatus, a moving image playback method, and a program thereof. For example, the present invention can be applied to a playback apparatus for playing back a moving image from a recording medium, such as a hard disk, an optical disc, or the like. In the present invention, moving image data, which has been produced by delta-sigma modulating a moving image for each pixel into delta-sigma modulated data, is recorded onto a recording medium. At playback time, the delta-sigma modulated data is subjected to filtering processing for each pixel to be converted into video data. Thus, the present invention allows a user to play back a user-desired moving image with higher definition than before.

2. Description of the Related Art

To date, in a camera-integrated recording and playback apparatus, an output signal produced by raster scanning from an imaging device has been subjected to analog-digital conversion processing, then has been subjected to white-balance adjustment, color-conversion processing, exposure compensation, etc., and has been recorded onto a recording medium. Also, a shutter speed has been set by the setting of charge-storage time of the imaging device. Also, a frame rate has been set by the setting of the drive signal of the imaging device. At the same time, a fast-forward playback has been carried out at playback time by thinning consecutive frames to be output, and a moving image has been played back in slow motion by repeatedly outputting a same frame at time intervals in accordance with a playback speed.

On the other hand, in recent years, new still image recording apparatuses, such as digital cameras, etc., have appeared in the marketplace. These apparatuses can omit white-balance adjustment, color-conversion processing, exposure-compensation processing, etc., and record RAW data, which is obtained by analog-digital conversion of the output signal of an imaging device, directly onto a recording medium. In the case of directly recording this RAW data, it is possible to reduce deterioration of image quality and to make various adjustments on the image quality at playback time compared with the case of performing white-balance adjustment, color-conversion processing, exposure-compensation processing, etc., before recording.

On such an imaging apparatus, International Publication No. WO2006/25232 specification has disclosed a configuration in which a result of photoelectric conversion by an imaging device is delta-sigma modulated for each pixel.

Incidentally, in a related-art playback of a moving image, techniques are not yet sufficient to output a moving image with the high definition that users desire.

That is to say, in a related-art playback of a moving image, when a playback in slow motion is carried out, a same frame is repeated in accordance with a playback speed, and thus it becomes difficult to play back the moving image with a smooth motion. Moreover, in this case, motion blurring also occurs. On the contrary, when a fast-forward playback is carried out, consecutive frames are thinned to be played back, and thus a motion becomes sporadically skipped. Thus, it also becomes difficult to play back the moving image with a smooth motion in this case. Accordingly, there has been a problem with a related-art playback of a moving image in that it is difficult to output a moving image with high definition that a user desires regarding a playback at a variable speed.

In this regard, in a slow-motion playback, as a method of smoothing a motion and to further prevent motion blurring, a method of obtaining an imaging result at a high frame rate and then outputting the moving image at a low frame rate through a recording medium is considered. However, in this case, when a playback is carried out at a normal playback speed, consecutive frames are thinned to be played back in the same manner as the case of the fast-forward playback described above. Accordingly, a motion becomes sporadically skipped, and thus, it also becomes difficult to play back the moving image with a smooth motion in this case. Also, in this case, a jerkiness disturbance occurs. Also, the same problem occurs in the case of a fast-forward playback. In this regard, in this case, a method of creating one frame by combining a plurality of frames by interpolation calculation processing of the image data is considered. However, in this method, there is a problem in that it becomes necessary to provide a buffer having a large storage capacity additionally, and the configuration becomes complicated.

Also, in a related-art playback of a moving image, when a content includes a fast-moving image, such as a sport, etc., it is possible to capture the image by a fast-speed shutter, and to play back the moving image with little motion blurring at playback time. Also, when a content includes a slow-moving image, such as a drama, etc., it is preferable to capture the image by an open shutter. However, in the related-art playback of a moving image, it is not allowed to vary the shutter speed at playback time, and thus there is a problem with the setting of a shutter speed in that it is difficult to output a moving image with high definition that a user desires.

SUMMARY OF THE INVENTION

The present invention has been made in view of the above-described points. It is desirable to propose a moving image playback apparatus, a moving image playback method, and a program thereof which allow the user to play back a user-desired moving image with higher definition than before.

According to an embodiment of the present invention, there is provided a moving image playback apparatus including: a data playback section playing back delta-sigma modulated data generated by performing delta-sigma modulation on pixel values of consecutive frames for each pixel; a video-data playback section performing filtering processing on the delta-sigma modulated data played back by the data playback section using a filter for each pixel to play back video data; and a control section controlling the filtering processing.

Also, according to another embodiment of the present invention, there is provided a method of playing back a moving image, including the steps of: playing back data from a recording medium, the data being delta-sigma modulated data generated by performing delta-sigma modulation on pixel values of consecutive frames for each pixel; performing filtering processing on the delta-sigma modulated data played back by the step of playing back data for each pixel to play back video data; and controlling the filtering processing.

Also, according to another embodiment of the present invention, there is provided a program of a method for playing back video data of a moving image, the program including the steps of: playing back data from a recording medium, the data being delta-sigma modulated data generated by performing delta-sigma modulation on pixel values of consecutive frames for each pixel; performing filtering processing on the delta-sigma modulated data played back by the step of playing back data for each pixel to play back video data; and controlling the filtering processing.

By the above-described configurations of embodiments of the present invention, it is possible to perform processing corresponding to a change in the shutter speed of video data by changing the number of samples to be supplied to filtering processing under the control of the filtering processing. Also, it is possible to perform processing corresponding to a change in the playback speed of video data by changing a cycle of the filtering processing on delta-sigma modulated data. Thereby, it is possible to output video data at a desired shutter speed and playback speed under the control of the filtering processing, and thus to play back the video data at a variable speed with smooth motion. Also, it is possible to set various shutter speeds at the time of slow-motion playback, etc., and to play back a desired moving image. Thereby, it is possible to play back a user-desired moving image with higher definition than before.

By the present invention, it is possible for a user to play back a user-desired moving image with higher definition than before.

BRIEF DESCRIPTION OF THE DRAWINGS

FIG. 4 is a flowchart illustrating a processing procedure of an integrator of the playback section of FIG. 3.

DESCRIPTION OF THE PREFERRED EMBODIMENTS

In the following, a detailed description will be given of embodiments of the present invention with reference to the drawings.

First Embodiment

1. Configuration of Embodiment

Figure 2:
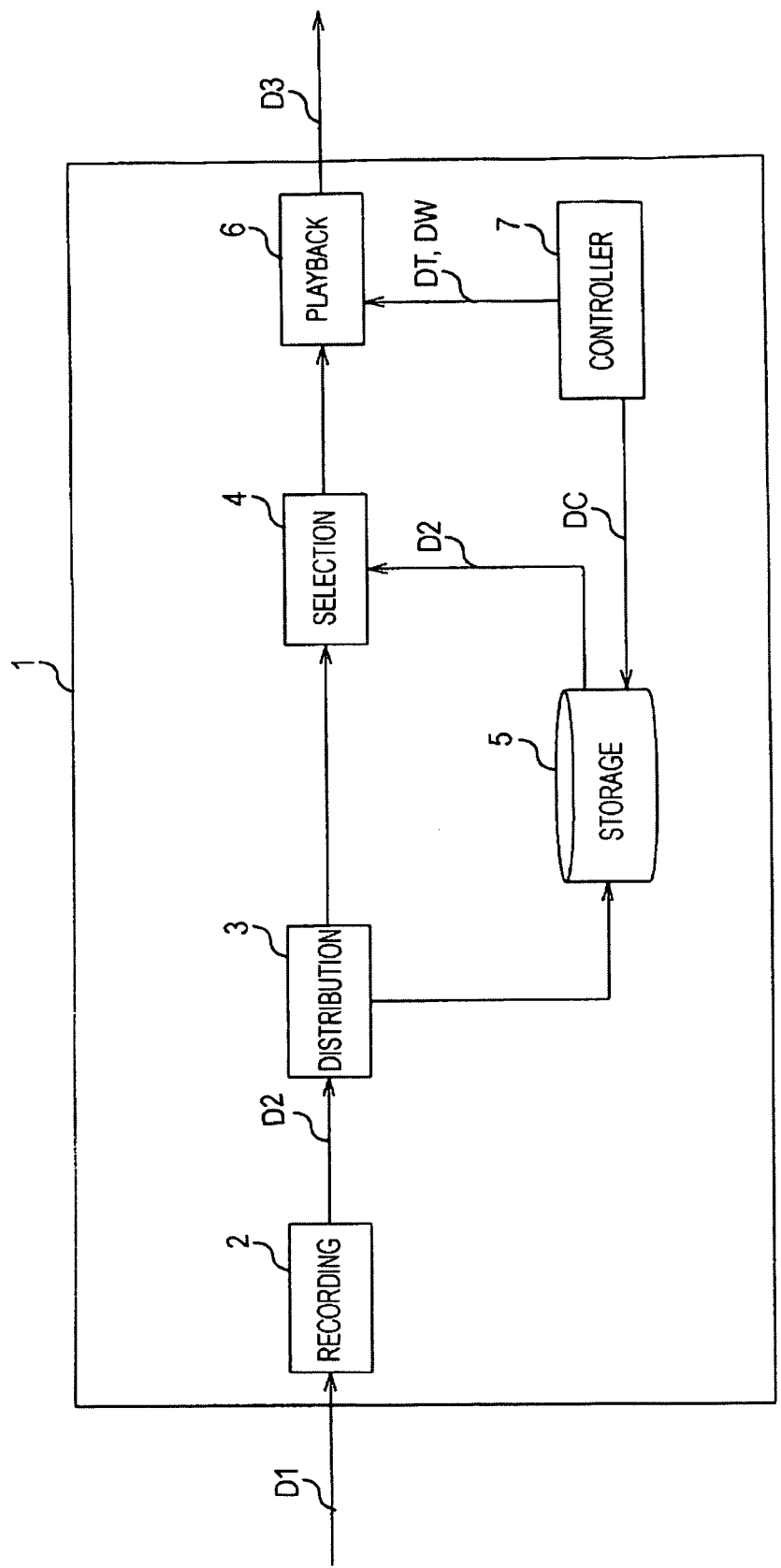
FIG. 2 is a block diagram illustrating the recording and playback apparatus according to the first embodiment of the present invention.

FIG. 2 is a block diagram illustrating a recording and playback apparatus according to a first embodiment of the present invention. In the recording and playback apparatus 1, a recording section 2 receives input of image data D1 captured at a high speed due to a high frame rate, performs delta-sigma modulation on the image data D1 for each pixel, and generates a delta-sigma modulated code string (in the following, called delta-sigma modulated data) D2 including one bit or a plurality of bits and having the same frame rate as that of the image data D1. In this regard, in this case, for example, as shown in International Publication No. WO2006/25232 specification, a captured result at a high frame rate may be directly processed for each pixel to be generated as delta-sigma modulated data D2.

At monitoring time, a distribution section 3 outputs the delta-sigma modulated data D2 directly to a selection section 4, whereas at recording time, the distribution section 3 outputs the delta-sigma modulated data D2 to a storage section 5. The storage section 5 is a recording and playback section of the delta-sigma modulated data D2, and at recording time, records and holds the delta-sigma modulated data D2 input from the distribution section 3 onto a recording medium, such as an optical disc, a hard disk, etc. Also, the storage section 5 plays back the delta-sigma modulated data D2 in sequence from a recording medium to output the data under the control of a controller 7.

At monitoring time, the selection section 4 outputs the delta-sigma modulated data D2 input from the distribution section 3 to a playback section 6. Also, at playback time, the selection section 4 outputs the delta-sigma modulated data D2 output from the storage section 5 to the playback section 6.

The playback section 6 is a video-data playback section which processes the delta-sigma modulated data D2 input from the selection section 4 to play back video data D3. The playback section 6 performs filtering processing on the delta-sigma modulated data D2 input from the selection section 4 to output the video data D3 at a predetermined frame rate.

Figure 1:
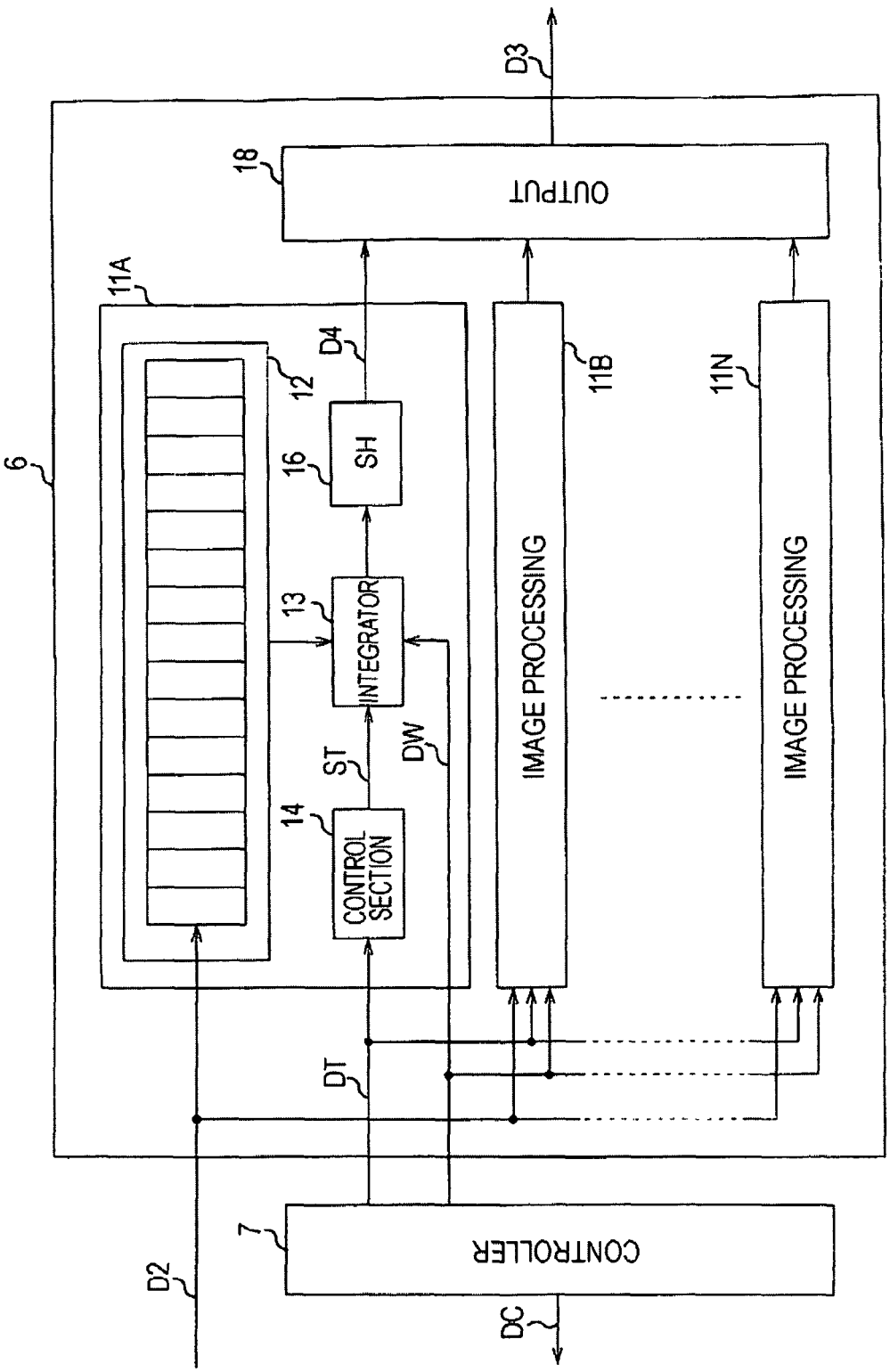
FIG. 1 is a block diagram illustrating a configuration of a playback section to be applied to a recording and playback apparatus according to a first embodiment of the present invention.

That is to say, as shown in FIG. 1, the playback section 6 processes the delta-sigma modulated data D2 using a decimation filter for each pixel to output the video data D3. Thus, the playback section 6 is provided with image processing sections 11A, 11B, ..., and 11N, each of which has a decimation filter, for individual pixels. Here, the image processing sections 11A, 11B, ..., and 11N have the same configurations with one another except that each of them has a different pixel to be processed. Accordingly, in the following, a detailed description will be given only of the image processing section 11A, and duplicated descriptions will be omitted.

Here, the image processing section 11A selects the delta-sigma modulated data D2 of the pixel allocated to be processed from the delta-sigma modulated data D2 input in sequence in the order of raster scanning, for example, to input the data into a buffer memory 12. The buffer memory 12 receives the input of the delta-sigma modulated data D2 in sequence, holds a predetermined number of samples. Also, the image processing section 11A outputs the held delta-sigma modulated data D2 to an integrator 13 by an instruction of the integrator 13.

The integrator 13 obtains the delta-sigma modulated data D2 in the range corresponding to an integration period DW output from the controller 7 from the buffer memory 12 by an integration-start signal ST output from the control section 14, and integrates the data. At this time, the integrator 13 sets a weighting factor for normalizing the integration result in accordance with the integration period DW, and performs integration processing by weighted integration using the weighting factor. Thereby, the image processing section 11A constitutes a decimation filter by the buffer memory 12 and the integrator 13, and outputs a pixel value D4 based on the integration value of the delta-sigma modulated data D2 of the number of samples corresponding to the integration period DW on a cycle of the filtering processing based on the cycle of the integration-start signal ST. Here, the integration period DW defines the number of plurality of frames when a plurality of frames of the image data D1 input at a high frame rate are combined into one frame image.

A sample-hold circuit (SH) 16 sample holds the pixel value D4 output from the integrator 13, and outputs the value. The control section 14 varies the timing of the integration-start signal ST in accordance with an update-period information DT output from the controller 7, and outputs the integration-start signal ST.

An output section 18 temporarily stores the pixel value D4 output from each of the image processing sections 11A, 11B, ..., and 11N, and outputs the value in the order of raster scanning, and thus the playback section 6 outputs the output data of the output section 18 as the video data D3. Thereby, the playback section 6 outputs the video data D3 based on the consecutive pixel values D4 in the order of raster scanning during the integration period DW on the frame cycle based on the cycle of the integration-start signal ST.

Here, one frame of the video data D3 output in this manner is produced by combining a plurality of frames, corresponding to the integration period DW, of the image data D1 having a high frame rate on the cycle of the integration-start signal ST. Accordingly, the video data D3 becomes equivalent to the data captured at a frame rate based on the cycle of the integration-start signal ST on the frame cycle of the delta-sigma modulated data D2, and at a shutter speed based on the integration period DW. Thus, in the playback section 6, if the number of samples to be supplied to the filtering processing using the decimation filter is varied by the variation of the integration period DW, it is possible to perform processing corresponding to the variation of the shutter speed of the video data D3. Also, if the cycle of the filtering processing on the delta-sigma modulated data D2 is varied by the variation of the cycle of the integration-start signal ST, it is possible to perform processing corresponding to the variation of the playback speed of the video data D3, and further to perform processing corresponding to the variation of the frame rate of the video data D3.

Thus, the controller 7 controls the operation of each part in response to the operation of the operator by the user to vary the integration period DW and the integration-start signal ST. That is to say, when monitoring the image data D1 is instructed by the user, the controller 7 causes the playback section 6 to input the delta-sigma modulated data D2 output from the recording section 2 through the distribution section 3 and the selection section 4, and to process the delta-sigma modulated data D2 to output the video data D3. Also, when recording the image data D1 is instructed by the user, the controller 7 causes the storage section 5 to input the delta-sigma modulated data D2 from the distribution section 3 to record the data onto a recording medium. Also, when a playback of the storage section 5 is instructed by the user, the controller 7 causes the storage section 5 to play back the delta-sigma modulated data D2, and to input the delta-sigma modulated data D2 played back into the playback section 6 through the selection section 4.

In this control, the controller 7 outputs the update-period information DT to each of the image processing sections 11A, 11B, ..., and 11N of the playback section 6 in response to the user's instruction, thereby setting the frame rate of the video data D3. Also, the controller 7 instructs the integration period DW corresponding to the shutter speed instructed by the user to each of the image processing sections 11A, 11B, ..., and 11N, thereby setting the shutter speed of the video data D3. Thus, the controller 7 varies the cycle of the filtering processing on the delta-sigma modulated data D2 in accordance with the frame rate of the video data D3, and also varies the number of samples to be supplied to the filtering processing in accordance with the shutter speed.

Specifically, for example, when the video data D3 is output at a frame rate of 60 [fps], the controller 7 outputs the update-period information DT so as to integrate on a cycle of $1/60$ [s], thereby setting the cycle of the filtering processing to $1/60$ [s]. Also, in this case, when the video data D3 is output at a shutter speed of $1/60$ [s] by an open shutter, the controller 7 sets the integration period DW so as to integrate the number of samples of the period corresponding to the shutter speed of $1/60$ [s]. On the other hand, if the user increases or decreases the shutter speed from the open shutter, the controller 7 sets the integration period DW so as to increase or decrease the number of integration samples in response to the user's operation. That is to say, for example, when the user instructs a shutter speed of $1/120$ [s], the controller 7 sets the integration period DW so as to integrate the number of samples of the period corresponding to the shutter speed of $1/120$ [s]. Also, when the user instructs a shutter speed of $1/30$ [s], which is greater than the shutter speed of the open shutter, the controller 7 sets the integration period DW so as to integrate the number of samples of the period corresponding to the shutter speed of $1/30$ [s].

On the other hand, if the video data D3 is output at a frame rate of 120 [fps], the controller 7 outputs the update-period information DT so as to integrate on a cycle of $1/120$ [s], thereby setting the cycle of the filtering processing to $1/120$ [s]. Also, in this case, the controller 7 sets the integration period DW in accordance with the shutter speed instructed by the user.

Also, when the user instructs a slow-motion playback or a fast-forward playback, the controller 7 controls the operation of the storage section 5 such that the bit rate of the delta-sigma modulated data D2 input into the playback section 6 becomes the bit rate corresponding to the playback speed instructed by the user. That is to say, in this case, for example, if the user instructs a slow-motion playback at a half speed, the controller 7 controls the operation of the storage section 5 such that the delta-sigma modulated data D2 is played back at a bit rate half the bit rate of the recording time to the storage section 5. Also, on the contrary, if the user instructs a fast-forward playback at a double speed, the controller 7 controls the operation of the storage section 5 such that the delta-sigma modulated data D2 is played back at a bit rate twice the bit rate of the recording time to the storage section 5.

Also, in this case, the controller 7 sets the update-period information DT by the frame rate of the video data D3, thereby varies the frame rate of the delta-sigma modulated data D2, and varies the cycle of the sampling processing of the delta-sigma modulated data D2 to output the variable-speed playback video data D3 at a predetermined frame rate. Also, the controller 7 sets the integration period DW such that the integration range is varied as much as the playback speed is varied corresponding to this. That is to say, at the time of the open shutter, the controller 7 sets the integration period DW as much as the cycle of the sampling processing varied relatively to the delta-sigma modulated data D2. Thus, for example, when a slow-motion playback is performed at a half speed, the controller 7 sets the integration period DW to a period half the period of the standard playback speed. Also, the controller 7 varies the integration period DW in accordance with an instruction by the user.

2. Operation of Embodiment

With the above-described configuration, in the recording and playback apparatus 1 (FIG. 2), image data D1 having a high frame rate is input into the recording section 2 in sequence, and the image data D1 is converted into the delta-sigma modulated data D2 by the delta-sigma modulation for each pixel. At monitoring time, the delta-sigma modulated data D2 is input into the playback section 6 through the distribution section 3 and the selection section 4, and is converted into the video data D3 here to be output to an external apparatus. On the other hand, by a user's instruction of recording, the delta-sigma modulated data D2 is input into the storage section 5, and is recorded in sequence by the storage section 5. Also, by a user's instruction of playback, the delta-sigma modulated data D2 recorded in the storage section 5 is played back to be input into the playback section 6 through the selection section 4, and the video data D3 is played back by the playback section 6.

Thus, in the recording and playback apparatus 1, the moving image based on the image data D1 having a high frame rate is recorded onto a recording medium as the delta-sigma modulated data D2 which has been delta-sigma modulated for each pixel, and processing is performed by each section. Here, it is possible for the delta-sigma modulated data D2, which has been delta-sigma modulated for each pixel, to ensure high image quality with a very low bit rate compared with shooting by a related-art high speed camera. Thus, in this embodiment, a moving image having a high frame rate is recorded onto a recording medium with the delta-sigma modulated data. Also, by performing processing in each section, it is possible to reduce the amount of consumption of recording medium, and further to avoid an increase in the processing speed in each section and in the transfer rate effectively.

Also, in the playback section 6 (FIG. 1), the delta-sigma modulated data D2 is distributed to the image processing sections 11A, 11B, . . . , and 11N for each pixel, and is input into a buffer memory in each of the image processing sections 11A, 11B, . . . , and 11N to be held for a predetermined number of samples. Also, the delta-sigma modulated data D2 held in the buffer memory 12 is integrated by the integrator 13 at the timing of the integration-start signal ST in accordance with the update-period information DT. Thereby, the delta-sigma modulated data D2 is subjected to filtering processing using a decimation filter based on the buffer memory 12 and the integrator 13 on a filtering cycle indicated by the update-period information DT, and is converted into data D4 indicating the pixel value of each pixel. The pixel-value data D4 is sample held by the sample holding circuit 16, then is sorted in the order of raster scanning, and is output by the output section 18 as the video data D3.

Thus, in the playback section 6, a plurality of frames of the delta-sigma modulated data D2 having a high frame rate are combined for each pixel by the filtering processing to generate the video data D3. Thereby, it is possible to vary the frame rate of the video data D3 by varying the cycle of this filtering processing. Also, by varying the cycle of the filtering processing on the delta-sigma modulated data D2, it is possible to dynamically vary the playback speed. Also, by varying the number of samples to be supplied to the filtering processing, it is possible to dynamically vary the shutter speed.

Accordingly, in this embodiment, the frame rate and the shutter speed, which have been allowed to set only at shooting time up to date, can be set variously at playback time. Thus, the related-art inconveniences on the variable-speed playback and shutter speed are resolved once for all, and the user is allowed to play back a moving image with higher definition that the user desires.

That is to say, by varying the cycle of the filtering processing on the delta-sigma modulated data D2 in accordance with the playback speed requested for the video data D3, it is possible to vary the frame rate of the video data D3 based on the delta-sigma modulated data D2. Thus, in this embodiment, by changing the frame rate of the delta-sigma modulated data D2 in accordance with the playback speed of the video data D3, the cycle of the filtering processing on the delta-sigma modulated data D2 is varied, thereby making it possible to vary the playback speed of the video data D3 variously.

Also, at this time, by varying the number of samples to be supplied to the filtering processing, the shutter speed is varied. Thus, the shutter speed is set as if a moving image captured at a high speed by a high-speed shutter is played back in slow motion, thereby making it possible to prevent motion blurring and to play back the moving image in slow motion with smooth motion. Also, at a normal playback speed, the shutter speed is set to the open shutter, and thus it is possible to effectively avoid jerkiness disturbance by smooth motion. Also, at a fast-forward playback, etc., it is possible to further decrease the shutter speed, and thereby to play back the moving image with smooth motion.

Also, when playback is carried out at a constant playback speed, it is possible to change the shutter speed variously. For example, when an image is fast moving, such as a sport, etc., a playback can be performed by a short shutter speed. When an image is slow moving, such as a drama, etc., a playback can be performed by a long shutter speed. Thus, it is possible to use a viewing method best suited to a content.

Also, it is possible to set a frame rate in accordance with an external apparatus. Thus, by setting a frame rate such that the ability of an external apparatus can be fully exercised, it is possible to view various contents with high image quality. That is to say, if the frame rate of an external apparatus is different from the frame rate of the video data to be played back from a recording medium, it has been necessary to perform processing for converting the frame rate up to date. This frame-rate conversion is processing, for example in the case of converting 24 P video data created by a movie film into 60 P video data, and thus deterioration of the image quality is inevitable. However, by this embodiment, it is possible to output video data having a desired frame rate without deteriorating of the image quality.

3. Advantages of Embodiment

With the above-described configuration, moving image data, which has been produced by delta-sigma modulating a moving image for each pixel into delta-sigma modulated data, is recorded onto a recording medium. At playback time, the delta-sigma modulated code string is subjected to filtering processing to be converted into video data. Thereby, it is possible to play back a user-desired moving image with higher definition than before.

Specifically, by applying a decimation filter to this filter, it is possible to play back a user-desired moving image with higher definition than before.

That is to say, the playback speed of video data is varied by varying a cycle of the filtering processing on the delta-sigma modulated data. Thereby, it is possible to play back a moving image with smooth motion by changing the playback speed variously.

Also, by varying the number of samples to be supplied to filtering processing to vary the shutter speed of the video data, it is possible to play back a moving image with various settings of the shutter speed. In particular, it is possible to output the video data at a shutter speed of a frame cycle or more, which has been difficult by the setting of a shutter speed at the time of related-art shooting. Thus, it is possible to further improve power of expression of a video content.

Also, by varying the cycle of the filtering processing to vary the frame rate of the video data, it is possible to output the video data by varying the frame rate variously.

Further, more specifically, the filter is constituted by a buffer receiving input of the delta-sigma modulated data in sequence and holding the data for a predetermined number of samples, and an integrator integrating the delta-sigma modulated data held in the buffer. Thus, the filtering processing is controlled by the control of the cycle of the integration by this integrator and the number of samples to be integrated by the integrator. Thereby, it is possible for a user to play back a moving image with a higher definition that the user desires than before.

Second Embodiment

In this embodiment, for example, the delta-sigma modulated data D2 recorded in the storage section 5 by applying a non-linear editing system is played back at a constant frame rate to generate video data D3, and the video data D3 is recorded onto a recording medium. In this embodiment, a recording and playback apparatus has the same configuration as that of the recording and playback apparatus of the first embodiment except that the control of the image processing sections 11A, . . . , and 11N related to the delta-sigma modulated data D2 and the video data D3 is different. Thus, in the following, a description will be given using the configuration in FIGS. 1 and 2.

In this embodiment, the controller 7 varies the update-period information DT in accordance with the playback speed of the video data D3, thereby varying the cycle of the filtering processing. Thus, the cycle of the filtering processing on the delta-sigma modulated data D2 is varied, and the playback speed of the video data D3 is changed variously. Also, in order to correspond to the variation of the cycle of the filtering processing, the number of samples to be supplied to the filtering processing is varied by the integration period DW. Thus, for example, when a slow-motion playback is performed at a half speed, the cycle of the filtering processing and the number of samples are set to a half the cycle and a half the number of samples in the case of a standard playback speed, respectively.

Also, the integration period DW is varied in response to a user's operation to vary the shutter speed variously.

In the same manner as this embodiment, by varying the cycle of the filtering processing in accordance with a playback speed of the video data to vary the cycle of the filtering processing on the delta-sigma modulated data, and changing the playback speed of the video data variously, it is possible to obtain the same effect as the first embodiment.

Third Embodiment

In this embodiment, the frame rate, the shutter speed, and the playback speed of the video data D3 to be played back are dynamically varied in accordance with an external apparatus and further for each content, for each frame, or for each plurality of frames. In this embodiment, a recording and playback apparatus has the same configuration as that of the recording and playback apparatus of the first embodiment except that these dynamically variable elements in the configuration are different. Thus, in the following, a description will be given using the configuration in FIGS. 1 and 2.

In this embodiment, the controller 7 detects the available frame rates of an external apparatus by the connection of the external apparatus to which the video data D3 is output. Also, the controller 7 sets the cycle of the filtering processing and the number of samples so as to output the video data D3 at the detected frame rate. Thus, the controller 7 dynamically sets the frame rate of the video data D3 in accordance with the external apparatus.

Also, an attribute-detection section, not shown in the figure, detects and records the attribute of the image data D1. In this regard, here, the attribute is information indicating motions in the image data D1 directly or indirectly. The attribute information indicating motions indirectly includes, for example, the types of programs, such as a drama, a sport, a movie, more detailed types, such as an action movie, a love story movie, a horror movie, etc. On the other hand, the attribute information indicating motions directly includes, for example, motion information produced by averaging, for each frame, the motion vectors detected for each predetermined block using a motion-vector detection circuit.

When the controller 7 plays back the delta-sigma modulated data D2 of a fast-moving content, and outputs the data as the video data D3 on the basis of indirect attribute information, the controller 7 sets the number of samples for the filtering processing so as to increase the shutter speed. Thereby, the controller 7 dynamically varies the shutter speed for each content.

Also, for a fast-moving scene, the controller 7 varies the number of samples for the filtering processing so as to increase the shutter speed for each frame or for each plurality of frames on the basis of the motion information detected by the motion vector. Thereby, the controller 7 dynamically varies the shutter speed for each frame or for each plurality of frames to output the video data D3 with further higher definition. Also, when the user instructs to vary the shutter speed, the controller 7 varies the shutter speed on the basis of the shutter speed varied in this manner.

Also, when an external apparatus is an apparatus capable of coping with various frame rates, if the apparatus can cope with a dynamical change in the frame rate, the controller 7 sets the cycle of the filtering such that the frame rate is increased for a fast-moving content by the indirect motion information, and changes the number of samples to be filtering processed correspondingly. Thereby, the controller 7 dynamically changes the frame rate for each content.

Also, further, for a fast-moving scene, the controller 7 sets the cycle of the filtering for each frame and for each plurality of frames so as to increase the frame rate by the direct motion information, and changes the number of samples to be filtering processed correspondingly. Thereby the controller 7 dynamically varies the frame rate of the video data D3 for each frame and for each plurality of frames.

By varying these frame rates, when the output of the video data D3 is the output to an external apparatus through a home network, etc., the controller 7 transmits the video data D3 with high definition, and reduces the load for the transmission of the video data D3 in the network as much as possible, thereby improving the utility efficiency of the network by individual apparatuses connected to the network.

Also, further, by the user changing the operation mode, the controller 7 varies the playback speed in accordance with the motion information, and sets the cycle of the filtering for each frame or for each plurality of frames so as to decrease the playback speed for a fast-moving scene. Also, the controller 7 varies the number of samples to be filtering processed correspondingly to this. Also, the controller 7 varies the frame rate of the delta-sigma modulated data D2 to be processed by the storage section 5 corresponding to the variation of the playback speed. Thus, the controller 7 dynamically changes the playback speed, and for example, at a critical moment, such as a goal scene, etc., in a sport program, the controller 7 plays back the scene automatically in slow motion. In this regard, in this case, the controller 7 may detect a climax, etc., and may dynamically vary the cycle of the filtering processing or the number of samples to be supplied to the filtering processing in place of the motion information or in addition to the motion information.

Like this embodiment, by dynamically varying the cycle of the filtering processing and the number of samples to be supplied to the filtering processing, it is possible to play back a moving image with further high definition.

Specifically, by varying the cycle of the filtering processing and/or the number of samples to be supplied to the filtering processing on the basis of the attribute of the moving image based on the delta-sigma modulated data, it is possible to play back a moving image with further high definition.

Also, further, by varying the cycle of the filtering processing and/or the number of samples to be supplied to the filtering processing on the basis of the motion information of the moving image based on the delta-sigma modulated data, it is possible to dynamically vary the shutter speed, the playback speed, and the frame rate in accordance with a moving image scene, and to play back a moving image with further high definition.

Fourth Embodiment

Figure 3:
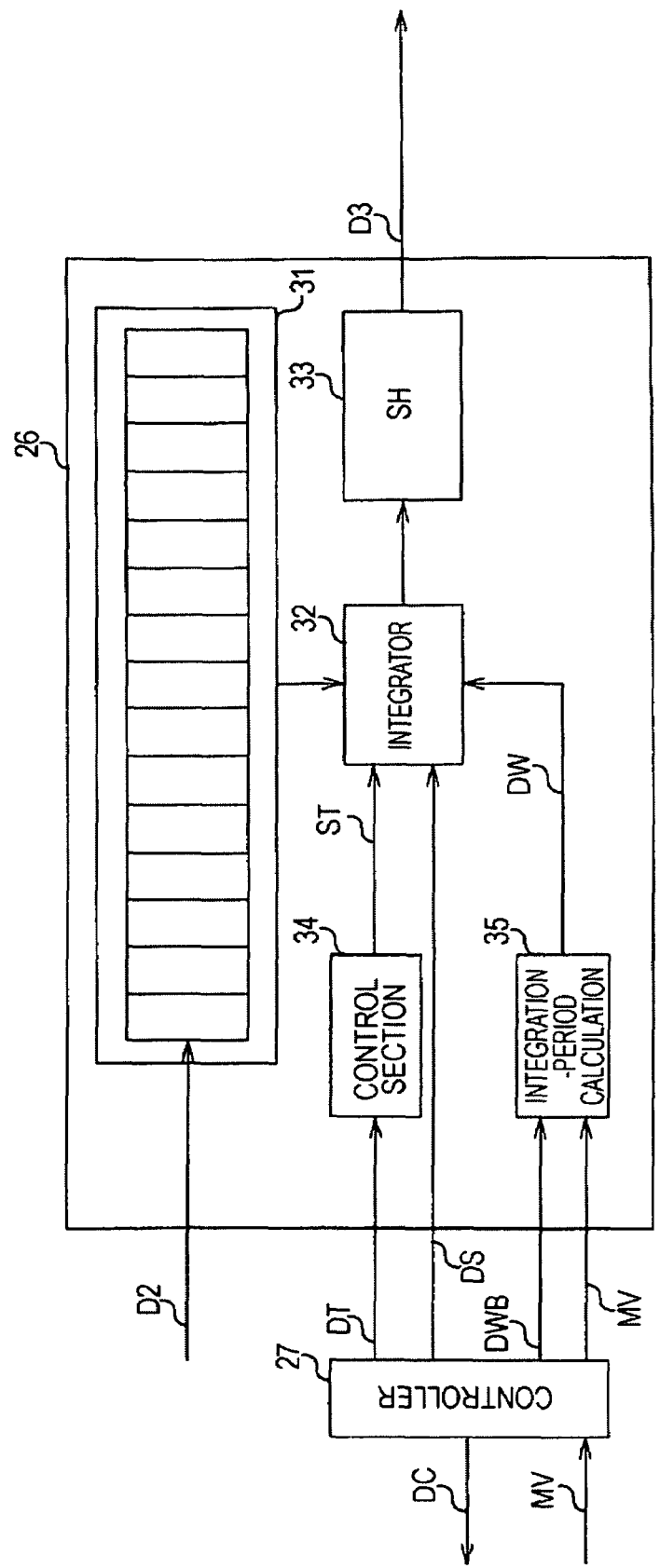
FIG. 3 is a block diagram illustrating a configuration of a playback section to be applied to a recording and playback apparatus according to a fourth embodiment of the present invention.

FIG. 3 is a block diagram illustrating a configuration of a playback section to be applied to a recording and playback apparatus according to a fourth embodiment of the present invention. The recording and playback apparatus of this embodiment has a motion-vector detection circuit, and at the time of recording, detects a motion vector MV of the image data D1 for each macroblock by the motion-vector detection circuit. Also, the recording and playback apparatus records the detected motion vector MV in the storage section 5 together with the delta-sigma modulated data D2 of the image data D1. The recording and playback apparatus dynamically varies the shutter speed in each part of one frame in the video data D3 in accordance with the motion information based on the motion vector MV. The recording and playback apparatus of this embodiment has the same configuration as those of the first to the third embodiments except that the control of the shutter speed is different.

This recording and playback apparatus is provided with a playback section 26 and the controller 27 in FIG. 3 in place of the playback section 6 and the controller 7, respectively. In this embodiment, the recording and playback apparatus has the same configuration as those of the recording and playback apparatuses of the first to the third embodiments.

Here, in the playback section 26, a buffer memory 31 is a memory having a storage capacity capable of storing a plurality frames of the delta-sigma modulated data D2. For example, the buffer memory 31 stores the delta-sigma modulated data D2 input in sequence in the order of raster scanning from the storage section 5, and holds a predetermined number of samples. Also, the buffer memory 31 outputs the held delta-sigma modulated data D2 under the control of an integrator 32.

The integrator 32 obtains the delta-sigma modulated data D2 from the buffer memory 31 for each pixel on the basis of area-size information DS specifying the size of the area to be processed, an integration-start signal ST, and integration time DW, performs integration processing, and then outputs the integration result.

A sample-hold circuit (SH) 33 sample holds the integration result output from the integrator 32, and outputs the value. A control section 34 varies the timing of the integration-start signal ST in accordance with an update-period information DT output from the controller 27 in the same manner as the control section 14 of the first embodiment, and outputs the integration-start signal ST.

An integration-period calculation section 35 compensates a standard integration period DWB output from the controller 27 with the motion vector MV detected in the macroblock including the pixels to be processed by the image processing section 11A in order to calculate an integration period DW, and outputs the integration period DW to the integrator 32.

Here, the standard integration period DWB is time information indicating a standard number of samples to be supplied to integration created by the controller 27 in the same manner as the integration period DW output from the controller 7 of the first embodiment. The integration-period calculation section 35 sets and outputs an integration period DW on the basis of the motion vector Mv such that the number of samples to be supplied to the integration becomes smaller than the number of samples of the standard integration period DWB as the motion becomes large, and on the contrary, the number of samples to be supplied to integration becomes smaller than the number of samples of the standard integration period DWB as the motion becomes small.

The controller 27 calculates an update period and an integration period in the same manner as the controller 7 of the first embodiment, and outputs as update-period information DT and a standard integration period DWB, respectively. In this regard, in this case, the integration period DW described in the second or the third embodiment may be set to the standard integration period DWB. Also, the controller 27 plays back the motion vector MV detected at the time of recording the delta-sigma modulated data D2 in sequence, and outputs the played-back motion vector MV to the playback section 26.

Thus, in this embodiment, a macroblock is set in an area for each processing unit, and a shutter speed is varied for each section of a moving image by the attribute of each section obtained by a motion vector. For example, in a still-image part, an image having high grayscale and a high S/N ratio is obtained by a sufficiently long shutter speed, whereas in a fast-moving moving-image part, an image without moving blurring is obtained. Accordingly, a moving image is played back with further higher image quality.

In this regard, a motion vector may be detected for each pixel to perform the above-described processing in place of the detection of a motion vector for each macroblock. Also, the controller 27 may determine a motion vector in each section, and an integration time period DW may be set for each of the image processing sections 11A, 11B, . . . , and 11N.

FIG. 4 is a flowchart illustrating the operation of the integrator 32. The integrator 32 performs the processing procedure for each frame of the video data D3. That is to say, when the processing procedure is started, the processing proceeds from step SP1 to SP2, and the integrator 32 performs initial-value setting processing. In the initial-value setting processing, the integrator 32 obtains one frame of the integration period DW for each macroblock obtained by compensating a standard integration period DWB output from the controller 27 by the motion vector MV. Also, the integrator 32 receives the input of the number of pixels of the macroblock in the horizontal direction Sbx and in the vertical direction Sby from the area-size information DS. Also, the integrator 32 initializes the parameter B identifying the delta-sigma modulated data D2 stored in the buffer memory 31.

Next, the processing proceeds to step SP3, and the integrator 32 initializes a variable y which identifies the position of the pixel in the vertical direction to be processed. Also, in the next step SP4, the integrator 32 initializes a variable x which identifies the position of the pixel in the horizontal direction to be processed. Next, in step SP5, the integrator 32 detects a horizontal-direction number bx and a vertical-direction number by of the macroblock to which the pixel of a position (x, y) belongs. In this regard, here, [x] is a function representing a maximum integer not exceeding x.

Next, the processing proceeds to step SP6, the integrator 32 loads, from the buffer memory 31, the delta-sigma modulated data D2 of the pixel of the position (x, y) on the basis of the integration period DW on a macroblock identified by the number bx and the number by to perform integration processing. After that, in step SP7, the integrator 32 normalizes the integration result sum. Also, in the next step SP8, the integrator 32 increments the variable x indicating the position of the pixel to be processed in the horizontal direction. In the next step SP9, the integrator 32 determines whether the processing has been completed for the right end of the image to be processed.

Here, if the answer is affirmative, the processing proceeds to step SP5, and the integrator 32 processes the next rightmost pixel. On the other hand, if the answer is negative in step SP9, the processing proceeds from step SP9 to step SP10, and the integrator 32 increments the variable y indicating the position of the pixel to be processed in the vertical direction. In the next step SP11, a determination is made on whether the processing has been completed for the lower end of the image to be processed.

Here, if the answer is affirmative, the processing proceeds to step SP4, and the integrator 32 processes the next rightmost pixel. On the other hand, if the answer is negative in step SP11, the processing proceeds from step SP11 to step SP12, and the integrator 32 outputs one frame of the integration result, then the processing proceeds to step SP13, and the processing procedure is completed.

By this embodiment, motion information of each part of the moving image based on the delta-sigma modulated data is detected, and the number of samples of the filtering processing in each part of one frame of the image is varied on the basis of the motion information. Thereby, it is possible to play back a moving image with still higher image quality.

Fifth Embodiment

In this regard, in the above-described fourth embodiment, etc., a description has been given of the case where a motion vector is detected at recording time. However, the present invention is not limited to this, and a motion vector may be detected from the delta-sigma modulated data or the video data at playback time.

Also, in the above-described fourth embodiment, a description has been given of the case where a shutter speed is varied in each part of one frame on the basis of the attribute information based on a motion vector. However, the present invention is not limited to this, and for example, a shutter speed may be varied on the basis of the information indicating the attribute of each part of an image, such as the information on whether there are many or few high-frequency components, whether there is deterioration of high-frequency components, or the like.

In the above-described embodiments, descriptions have been given of the cases of generating video data by hardware. However, the present invention is not limited to this. For example, the present invention may be applied to moving image processing performed by a computer, and video data may be generated by software processing.

It should be understood by those skilled in the art that various modifications, combinations, sub-combinations and alterations may occur depending on design requirements and other factors insofar as they are within the scope of the appended claims or the equivalents thereof.

What is claimed is:

1. A moving image playback apparatus comprising:
a data playback section playing back delta-sigma modulated data generated by performing delta-sigma modulation on pixel values of consecutive frames for each pixel;
a video-data playback section performing filtering processing on the delta-sigma modulated data played back by the data playback section using a filter for each pixel to play back video data; and
a control section controlling the filtering processing, wherein the control section:
varies a number of samples to be supplied to the filtering processing to vary a shutter speed of the video data, and
varies a cycle of the filtering processing to vary a frame rate of the video data.

2. The moving image playback apparatus according to claim 1,
wherein the filter is a decimation filter.

3. The moving image playback apparatus according to claim 1,
wherein the control section varies a cycle of the filtering processing on the delta-sigma modulated data to vary a playback speed of the video data.

4. The moving image playback apparatus according to claim 1,
wherein the control section adaptively varies a cycle of the filtering processing on the delta-sigma modulated data and/or a number of samples to be supplied to the filtering processing.

5. The moving image playback apparatus according to claim 1, further comprising an attribute-detection section detecting an attribute of a moving image based on the delta-sigma modulated data,
wherein the control section varies a cycle of the filtering processing on the delta-sigma modulated data and/or a number of samples to be supplied to the filtering processing on the basis of the attribute.

6. The moving image playback apparatus according to claim 5,
wherein the attribute is motion information of the moving image based on the delta-sigma modulated data.

7. The moving image playback apparatus according to claim 1, further comprising a motion-information detection section detecting motion information of each part of a moving image based on the delta-sigma modulated data,
wherein the control section varies a number of samples to be supplied to the filtering processing at each of the parts on the basis of the motion information.

8. The moving image playback apparatus according to claim 1,
wherein the filter has a buffer receiving input of the delta-sigma modulated data according to a pixel to be processed and holding a predetermined number of samples, and
an integrator integrating the delta-sigma modulated data held in the buffer, and
the control section controls the filtering processing under the control of a cycle of integration by the integrator and/or a number of samples to be integrated by the integrator.

9. A method of playing back a moving image, comprising the steps of:

playing back data from a recording medium, the data being delta-sigma modulated data generated by performing delta-sigma modulation on pixel values of consecutive frames for each pixel;

performing filtering processing on the delta-sigma modulated data played back by the step of playing back data for each pixel to play back video data; and controlling the filtering processing, wherein controlling the filtering processing comprises:

varying a number of samples to be supplied to the filtering processing to vary a shutter speed of the video data, and varying a cycle of the filtering processing to vary a frame rate of the video data.

10. A non-transitory computer-readable medium storing a program of a method for playing back video data of a moving image, the program comprising the steps of:

playing back data from a recording medium, the data being delta-sigma modulated data generated by performing delta-sigma modulation on pixel values of consecutive frames for each pixel;

performing filtering processing on the delta-sigma modulated data played back by the step of playing back data for each pixel to play back video data; and controlling the filtering processing, wherein controlling the filtering processing comprises:

varying a number of samples to be supplied to the filtering processing to vary a shutter speed of the video data, and varying a cycle of the filtering processing to vary a frame rate of the video data.

* * * * *